United States Patent [19]

Richiardone et al.

[11] Patent Number: 5,729,891
[45] Date of Patent: Mar. 24, 1998

[54] METHOD OF SEALING AND PACKAGING A LEAD ACID BIPOLAR BATTERY BY USING POLYOLEFIN BASED MATERIALS

[75] Inventors: Valter Richiardone, Milan; Furio Rossetti, Cuorgne; Marco Zampolli, Santena; Paolo Tosco, Turin; Francesco D'Oria, Milan; Mario Vitali, Cassina de' Pecchi; Aurelio Buscotti, Cerro Maggiore; Franco Mostarda, Bobbiate, all of Italy

[73] Assignees: Edison Termoelettrica S.p.A., Trofarello; Ricerca Applicata Montedison S.R.L., Bollate, both of Italy

[21] Appl. No.: 578,069

[22] Filed: Dec. 27, 1995

[30] Foreign Application Priority Data

Dec. 30, 1994 [IT] Italy ................ TO94A1097

[51] Int. Cl.⁶ .................................. H01M 10/18
[52] U.S. Cl. ........................ 29/623.2; 429/210
[58] Field of Search .................. 29/623.2; 429/210

[56] References Cited

U.S. PATENT DOCUMENTS

| | | | |
|---|---|---|---|
| 4,037,031 | 7/1977 | Jacob | 429/149 |
| 4,164,068 | 8/1979 | Shropshire et al. | 29/623.1 |
| 4,900,643 | 2/1990 | Eskra et al. | 429/241 |
| 5,035,045 | 7/1991 | Bowen et al. | 29/623.2 |
| 5,562,741 | 10/1996 | Meadows et al. | 29/623.2 |

FOREIGN PATENT DOCUMENTS

| | | |
|---|---|---|
| 0 631 338 | 12/1994 | European Pat. Off. |
| 655628 | 4/1929 | France. |
| 2304188 | 10/1976 | France. |
| 24 07 853 | 9/1975 | Germany. |
| 61-058159 | 3/1986 | Japan. |
| 62-031942 | 2/1987 | Japan. |
| 63-274055 | 11/1988 | Japan. |
| WO 94/07272 | 3/1994 | WIPO. |

Primary Examiner—John S. Maples
Attorney, Agent, or Firm—Merchant, Gould, Smith, Edell, Welter & Schmidt

[57] ABSTRACT

A lead acid bipolar battery comprises a plurality of bipolar electrodes stacked between two monopolar end collectors in turn closed by end plates. All electrodes have respective plastic stiffening edge frames. The spacer frames are interposed between the electrodes to support the electrode frames. The spacer frames contain electrolyte supporting material and have electrolyte inlet bores and gas outlets. The stack is surrounded by a layer of eventually strengthened polyolefin material which seals the stack and provides a housing for the battery.

3 Claims, 3 Drawing Sheets

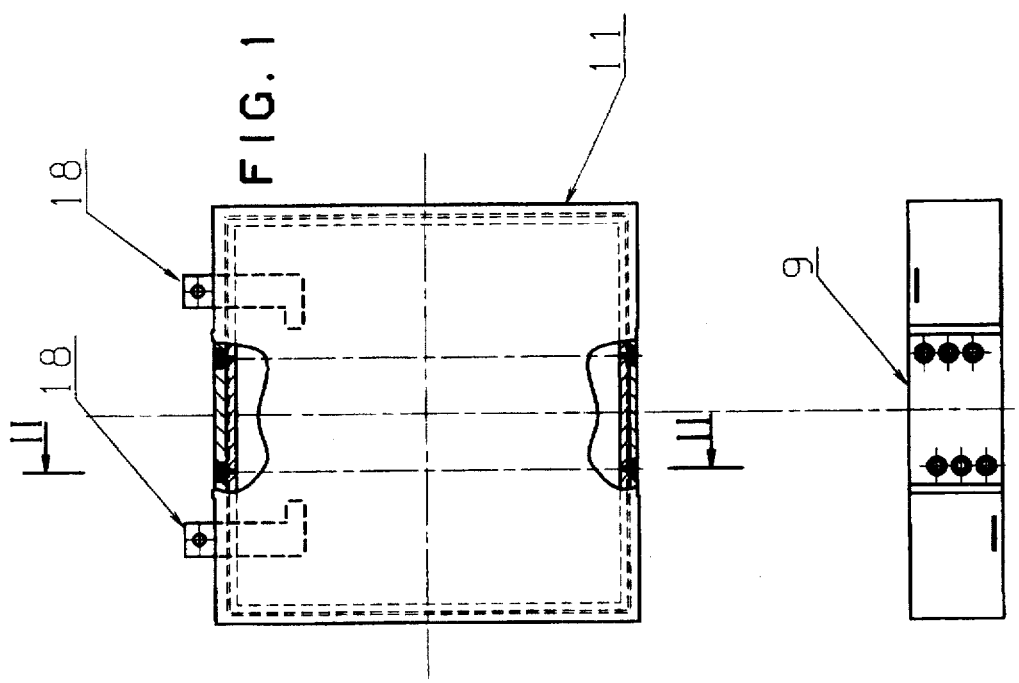
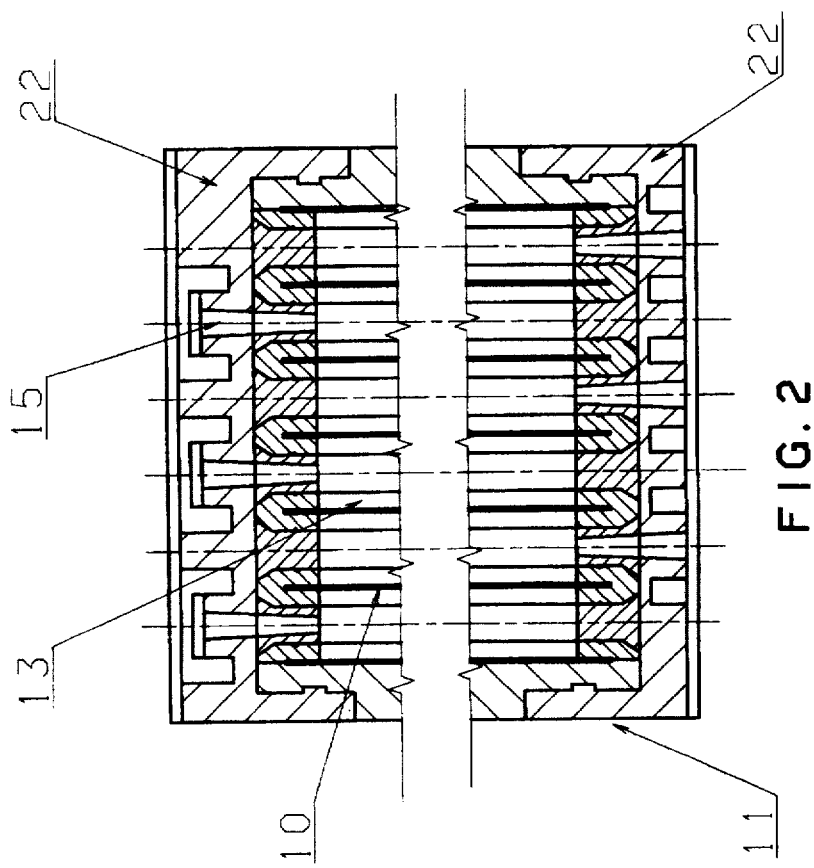

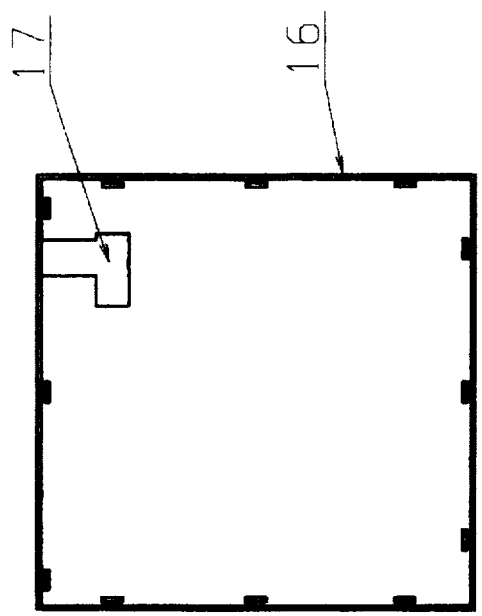
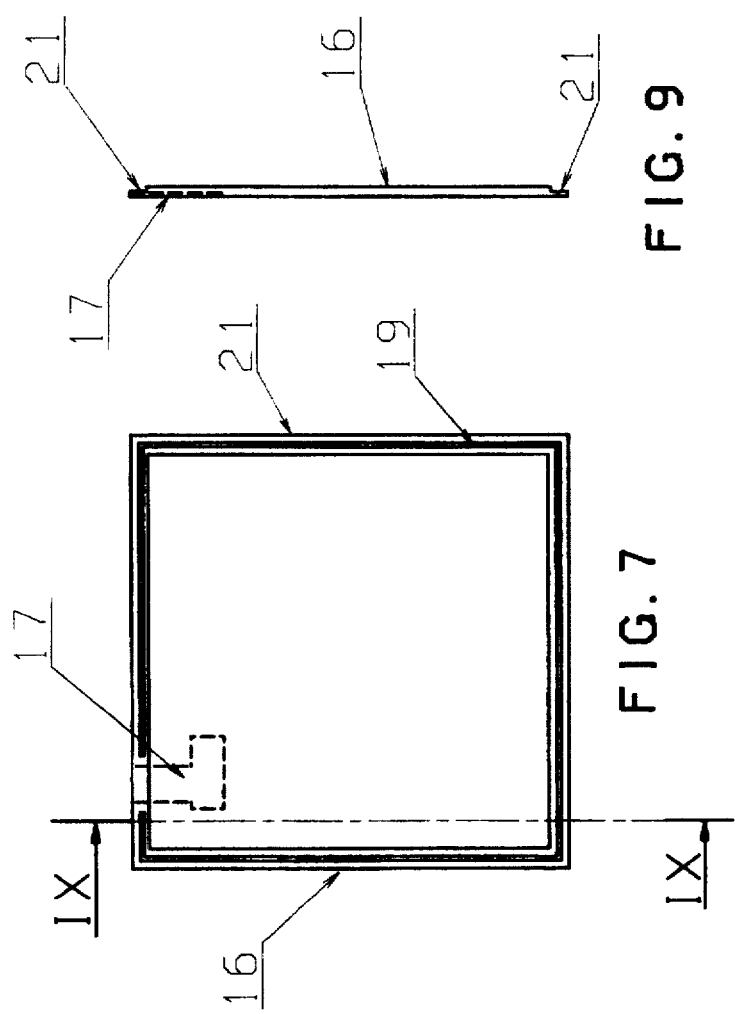
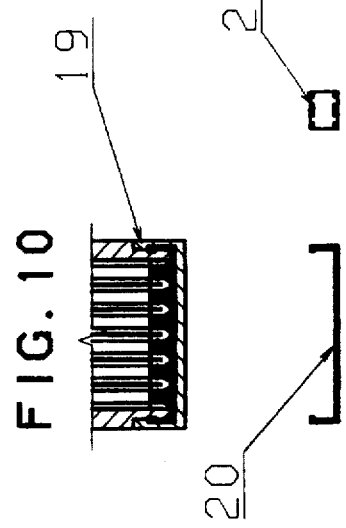

//5,729,891//

METHOD OF SEALING AND PACKAGING A LEAD ACID BIPOLAR BATTERY BY USING POLYOLEFIN BASED MATERIALS

BACKGROUND OF THE INVENTION

1. Field of the Invention

The present invention refers to the construction of hermetically sealed lead acid bipolar batteries. More specifically, the invention relates to a method of forming and assembling the seal components of the electrode stack and sealing same by molding a final packaging frame thereon.

2. Description of Prior Art

Several prior art documents disclose a typical bipolar battery arrangement. The electrode stack is formed by the union of a number of frames of thermoplastic material, each of which is fitted with an inside bipolar electrode plate and has surfaces extending beyond the plate. Said extending surfaces provide coupling to adjacent frames.

The electrode stack is formed by stacking the single frames on one another in a sequence so as to alternate electrodes having opposite polarities and interposing glass microfiber separators therebetween.

Accordingly, the above cited frames act as spacer members between the cells, as their coupling forms a cell unit comprising the negative electrode, the separator and the positive electrode, as known in the art.

In some prior art cases, frames are provided with one or a number of channels communicating with the inside of the cell. For example, in U.S. Pat. No. 4,900,643 each frame has a pair of grooves running along its longer side, whereby coupling of two consecutive frames determines an inner double channel for filling the cell and letting the gas out, respectively.

The main condition for ensuring correct operation of the bipolar battery is the effectiveness of the sealing between the coupled frames. Sealing action of each cell must be hermetical with respect to adjacent cells and the outside.

In the past, prior art sealing was provided joining coupling frames by heat welding. In U.S. Pat. No. 5,035,045 this is accomplished by using an infrared heater positioned in the space between the coupling surfaces of two frames. When the surfaces begin to melt, the heating unit is withdrawn and the frames are moved and into contact with each other and slightly pressed together to weld.

An alternative approach is disclosed in U.S. Pat. No. 4,164,068, which makes provision of ultrasonic soldering.

The development of bipolar batteries has been hindered by inadequate solutions being adopted for providing hermetical sealing to the cells. Among the problems which are encountered more frequently there is that of deformation of contacting surfaces due to high temperatures and relatively thin frames. This results in inadequate welding in some points of the perimeter of the frame. This also adversely affects operation of the communicating channels.

On the other hand, welding operations are excessively complicated and costly, and are not adequate from an industrial point of view.

SUMMARY OF THE INVENTION

The present invention solves the sealing and packaging problems of lead acid bipolar batteries by:

a) using a different arrangement of the sealing members: the cell unit consists of the coupling of a central spacer member and opposite frames of electrodes of different polarity;

b) using new modes of sealing cell sealing members by molding a side frame which serves to form a housing for the electrode stack and forms seats for gas outlet valves.

The present invention represents an improvement with respect to prior art sealing and packaging of bipolar batteries.

It is an object of the present invention to provide an original arrangement of the hermetic sealing members, wherein the electrode frames are coupled to a central spacer frame. Said members are stacked in series and sealed by molding a final packaging frame.

It is another object of the present invention to provide an original solution concerning modes of sealing and packaging the electrode stack of a lead acid bipolar battery. Functionality of the system is made effective by:

hermetic sealing of each cell with respect to the adjacent cells and the outside;

uniform spacing between electrodes having the same polarity;

regular dimensions of the active electrode surface;

regular shape of cell inlet channels in order to:
  a) introduce the electrolyte easily and practically in a cell, independently of the other cells, with a speed satisfying manufacture requests;
  b) allow, at a predetermined inner pressure, the outlet of gases which form within the battery;

contain the preloading required to gain good physical contact between the electrodes and the glass microfiber separators.

The present invention provides a lead acid bipolar battery where coupling of its components is simple. The assembly of the electrode stack is rendered easy and gives a reliable and functional final product.

It is another object of the present invention to provide a method of sealing the cells of a lead acid bipolar battery, simultaneously packaging the battery so as to guarantee hermetical sealing and mechanical strength to the battery in use.

In accordance with the invention, there is provided a method as claimed in claim 1.

BRIEF DESCRIPTION OF THE DRAWINGS

In order that the present invention may be well understood there will now be described a preferred embodiment thereof, given by way of example, reference being made to the accompanying drawings, in which:

FIG. 1 is a schematic front view of a battery constructed according to the present invention;

FIG. 2 is a schematic sectional view, to an enlarged scale, taken along the line II—II of FIG. 1;

FIG. 3 is a top view of the battery of FIG. 1;

FIGS. 7 and 8 are plan views of the end plates of the battery;

FIG. 9 is a sectional view taken along line IX—IX of FIG. 7; and

FIG. 10 shows front and side views of a further detail mounted and detached.

GENERAL DESCRIPTION OF THE METHOD OF THE INVENTION

A plastic frame is molded on the electrode made of lead or other electrically conductive material or polymeric material (such as polyaniline, polyparaphenylene, polypirrole), or ceramic material (for example titanium carbide or molybdenum silicide). The frame is for stiffening the electrode, provide a reference during assembly, seal the edge of the electrode and eventually provide a reference for applying the desired thickness of active compound.

Spacer frames are provided to be interposed between the electrodes and contain electrolyte supporting material, for example glass microfiber layers. The spacer frames are provided with electrolyte inlet bores and gas outlet bores.

Stack end plates are provided.

Bipolar electrodes are stacked between the end plates. The bipolar electrodes have active compounds applied thereto and are alternately arranged with the electrolyte support containing frames. The end electrodes are monopolar and the intermediate ones bipolar. A preloading is applied to the stack.

The stack is preloaded in a mold and a layer of polyolefin material is molded over the stack to seal same and provide a housing for the battery. Gas outlet valves are obtained at the electrolyte inlet bores.

To attain perfect sealing of the battery, the materials forming the electrode frames, the spacer frames and the end plates are chemically compatible therebetween and with the molding material so as to heat seal in the contact zones during packaging.

DETAILED DESCRIPTION OF THE INVENTION

With reference to the enclosed drawings, the method of constructing a battery according to the present invention comprises firstly the step of providing a series of electrodes 10, of which the intermediate ones are bipolar while the terminal electrodes are monopolar. Each electrode 10 includes a substantially rectangular plate of electrically conductive material. Securely and continuously fixed to the outer edge of the plate is a peripheral frame of polyolefinic material for stiffening the plate, sealing its the edge and providing a reference member useful in applying the active compound to the faces of the plate. Preferably, the frame is obtained by pressure molding and welding of two complementary plastic half-frames separately obtained by injection molding in a separate mold. Advantageously, the half-frames are of a polyolefin based material being modified with polar groups adapted to bind chemically to the conductive substrate.

Figure 6:
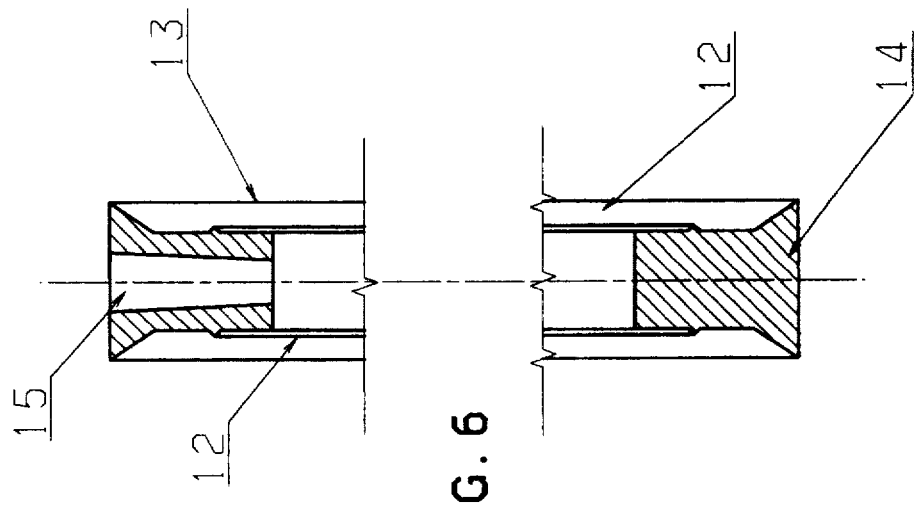
FIG. 6 is a sectional view of the spacer member of FIG. 4.
Figure 4:
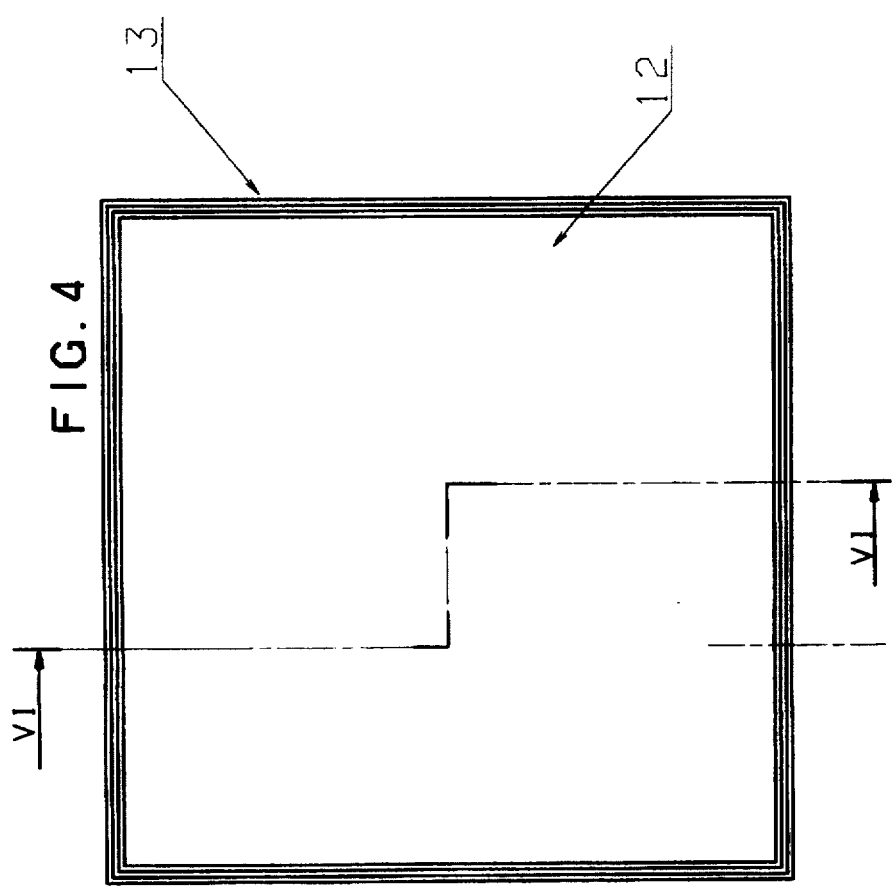
FIGS. 4 and 5 are front and side views, respectively, of a spacer member being part of the battery.
Figure 5:
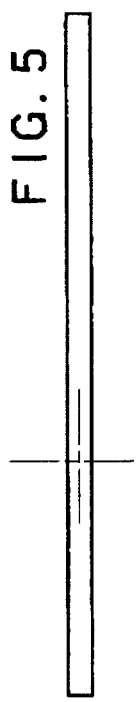

With reference to FIGS. 4 to 6, there is shown a spacer 13 according to the present invention. The spacers are frame-like members having a shape corresponding to that of the electrodes and alternately arranged therewith. Besides keeping the predetermined distance between adjacent electrodes, each spacer acts as an outer housing for a conventional porous layer 12 supporting the electrolyte. Typically, glass microfiber layers are use for this purpose.

Preferably, the spacer is obtained through injection molding of polyolefin based material chemically compatible with the plastic material constituting the frames so as to solder thereto during molding. For example, talc added polypropylene or glass added polypropylene are suitable for forming the spacers. The added materials have to be chosen so as to provide greater stiffness and size accuracy with respect to the electrode frames, provide the desired dimension of the assembled battery stack and attain greater heat resistance during molding of the outer housing, as will be apparent herein after.

The cross-section of spacers 13 (FIG. 6) is so shaped as to contain the electrodes 10. Therefore, transverse seats 14 are obtained along the edge of both of their sides. Seats 14 prevent the spacer and the electrode frame from sliding relative to one another during manufacturing and also improve the sealing. A vertical, preferably tapered bore 15 is formed in each spacer for filling the assembled battery with electrolyte (FIG. 2). Advantageously, each bore 15 is formed by two pins (not shown) mounted to moving parts of the mold used for forming the spacer.

Referring to FIGS. 7 to 9, each battery is fitted with a pair of flat end plates 16. The thickness of end plates 16 depends on the inner pressure acting in the pre-loading initial stage and the following stages of forming and loading. Also, the thickness depends on maximum yielding that is admissible in the center of each plate. Advantageously, end plates 16 are of a thermoplastic polymer material chemically compatible with the material forming the spacers, so as to heat seal to the molding material during packaging.

Obtained in each end plate 16 on the side facing the inside of the battery is a seat 17 for a terminal 18 welded to the end monopolar collector electrode plate. On the outwardly facing side there is formed a thinner edge portion 21 to be filled with molding material during the final manufacturing step. Within thinner edge portion 21 a channel 19 is formed constituting a seat for hooking clips 20 adapted to keep the assembled stack firm (FIG. 10).

In assembling the components of the battery (end plates, monopolar and bipolar electrode plates with active compound, spacers, etc.) a special press (not shown) is used which provides stacking and centering of the components, and successive pre-compression of same until the desired thickness is reached.

Said press comprises two faces, of which one is movable and one is stationary with reference templates. Suitable pneumatic rams drive the movement of the movable face and control the drawing system.

The assembled and pre-compressed stacks are kept in position by hooking clips 20 fitted to the sides of the stacks in the special seats of end plates 16.

Referring to FIG. 2, sealing and final packaging of the battery stack are accomplished by injection molding of a special plastic material 22, for example suitably strengthened polypropylene.

Then, the assembled stack is positioned within the injection mold with special means, for example plugs also serving to close the acid inlet bores, seats in the end plates, bores in the terminal current collectors, templates retractable after the closing of the mold, etc.

We claim:

1. A method of sealing and packaging a lead acid bipolar battery, comprising:

providing an electrode plastic frame of a polyolefin based material modified with polar groups along edges of each of a plurality of electrode plates;

interposing a plurality of spacer frames of the polyolefin based material modified with polar groups between the framed electrode plates to form an inner stack, the spacer frames providing seats for accommodating adjacent electrode frames in a stacked arrangement, the spacer frames having electrolyte inlet bores and gas outlet bores and containing electrolyte supporting material;

providing stack end plates;

stacking the inner stack between the end plates to form a stack, the framed electrodes having active compounds applied thereto and being alternately arranged with the electrolyte support containing frames, electrodes at ends of the stack being monopolar and the intermediate electrodes being bipolar;

applying clip members to sides of the stack in seats on the end plates;

fitting the clipped stack in a mold; and molding a layer of polyolefin material over the stack to seal the stack and to provide a housing for the battery, obtaining gas outlet valves at the electrolyte inlet bores;

wherein the materials of the electrode frames, the spacer frames and the end plates are chemically compatible therebetween and with the molding polyolefin material, so as to bond portions of the housing in contact with portions of the electrode frames, the spacer frames and end plates during the molding step.

2. A method of sealing and packaging a battery, comprising:

providing a frame of a polyolefin-based material, modified with polar groups, along edges of electrode plates;

providing stack end plates, electrolyte supporting material and spacer frames, the spacer frames having seats on first and second faces to accommodate electrode frames, having electrolyte inlet bores and gas outlet bores, the stack end plates and spacer frames being formed of the polyolefin-based material, modified with polar groups;

forming, between two of the stack end plates, a stack of framed electrode plates, electrolyte supporting material and spacer frames, electrodes proximate the first and second end plates being monopolar and the remaining electrodes being bipolar;

holding the stack together with clips;

fitting the clipped stack in a mold;

molding a layer of molding polyolefin material over the stack to form a housing around the stack, obtaining gas outlet valves at the electrolyte inlet bores, the molding polyolefin material being chemically compatible with the polyolefin based material; and directly bonding the resulting housing to portions of the electrode frames, the spacer frames and the end plates contacting the housing.

3. The battery as recited in claim 2, wherein the stack includes alternating framed electrode plates and spacer frames, with electrolyte supporting material positioned in spaces between adjacent framed electrode plates.

* * * * *

UNITED STATES PATENT AND TRADEMARK OFFICE
CERTIFICATE OF CORRECTION

PATENT NO. : 5,729,891

DATED : MARCH 24, 1998

INVENTOR(S) : RICHIARDONE ET AL.

It is certified that error appears in the above-identified patent and that said Letters Patent is hereby corrected as shown below:

Title page [73] Assignee: insert —CSI— after the name "Trofarello"

Signed and Sealed this

Thirty-first Day of August, 1999

Q. TODD DICKINSON

*Attest:*

*Attesting Officer*  Acting Commissioner of Patents and Trademarks